United States Patent [19]

Sakamaki

[11] 4,161,317

[45] Jul. 17, 1979

[54] SEAL RING FOR ROTARY SHAFT

[75] Inventor: Hiroshi Sakamaki, Utsunomiya, Japan

[73] Assignee: Nippon Piston Ring Co., Ltd., Tokyo, Japan

[21] Appl. No.: 651,870

[22] Filed: Jan. 23, 1976

Related U.S. Application Data

[63] Continuation of Ser. No. 524,187, Nov. 15, 1974, abandoned.

[30] Foreign Application Priority Data

Nov. 17, 1973 [JP] Japan .............................. 48-132260[U]

[51] Int. Cl.² ................................................ F16J 9/00
[52] U.S. Cl. ...................................... 277/25; 277/135; 277/195; 277/198; 277/223
[58] Field of Search .................. 277/25, 192, 195, 197, 277/198, 199, 140, 148, 223, 224, 135

[56] References Cited

U.S. PATENT DOCUMENTS

| | | | |
|---|---|---|---|
| 1,500,252 | 7/1924 | Marshall | 277/198 |
| 2,640,746 | 6/1953 | Phillips et al. | 277/223 |
| 3,108,817 | 10/1963 | Hughes | 277/223 |

*Primary Examiner*—Lenard A. Footland
*Attorney, Agent, or Firm*—Sughrue, Rothwell, Mion, Zinn and Macpeak

[57] ABSTRACT

A seal ring usable in a rotary shaft and formed with a gap between its peripheral ends, characterized in that an annular groove is formed on the outer peripheral surface of said seal ring, and in that an auxiliary seal ring, which is formed with a gap between its peripheral ends and which has a rectangular cross section, is installed in the annular groove of said seal ring with clearances being left between the side faces of said auxiliary seal ring and said annular groove and with the gaps of said seal ring and said auxiliary seal ring being misaligned from each other.

2 Claims, 6 Drawing Figures

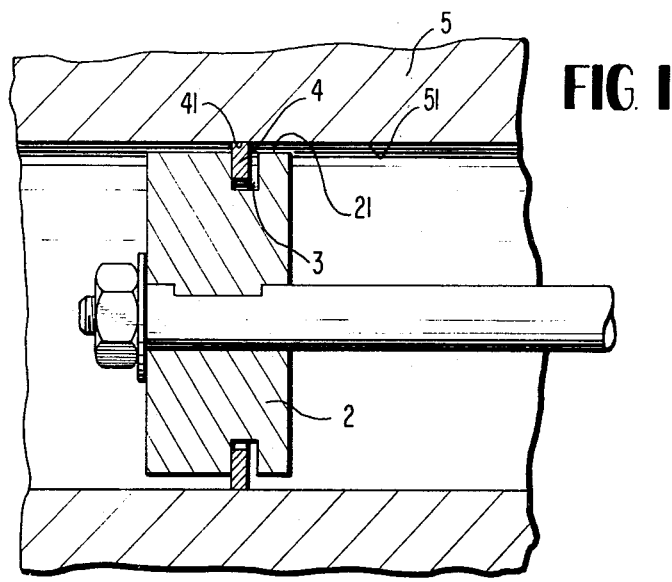
FIG. 1 PRIOR ART
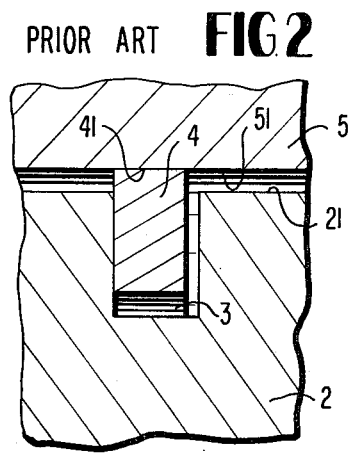
PRIOR ART FIG. 2
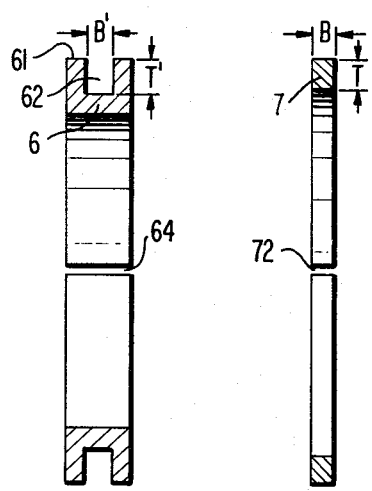
FIG. 3A   FIG. 3B
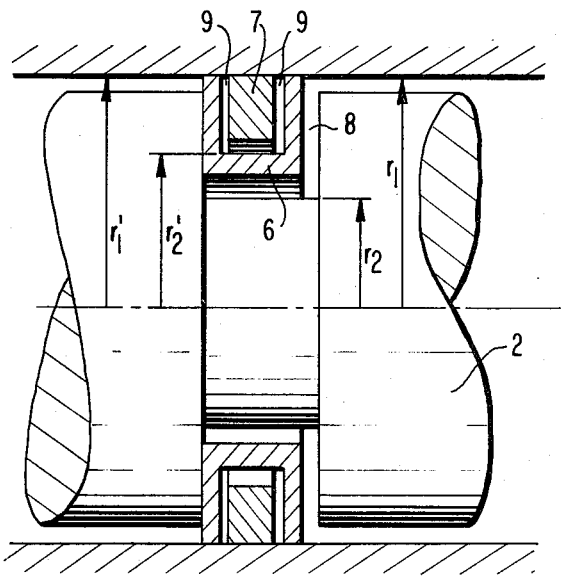
FIG. 5
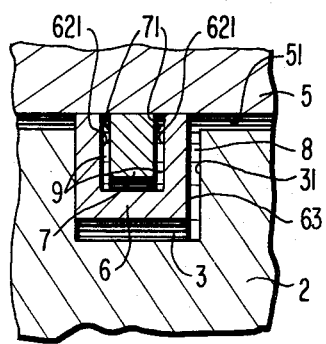
FIG. 4

SEAL RING FOR ROTARY SHAFT

This is a continuation of application Ser. No. 524,187, filed Nov. 15, 1974, abandoned.

BACKGROUND OF THE INVENTION

1. Field of the Invention:

The present device relates to a seal ring used in a rotary shaft for providing sealing effect between relatively rotational mechanical members, such as a rotary shaft and a casing, so as to avoid any possibility of liquid leakage.

2. Description of the Prior Art:

In a prototype rotary shaft seal ring, an annular seal groove 3 is formed on the outer periphery 21 of a carrier 2, and a seal ring 4 of a rectangular cross section, which is formed with a gap between its peripheral ends and which is made expandable radially outwardly, is installed in the seal groove 3, as shown in FIGS. 1 and 2. Although such seal ring 4 is used widely, its performance can hardly be said as sufficiently satisfactory. In the conventional seal ring, more specifically, innegligible leakage of the working fluid will take place not only through a slight clearance between the inner wall 51 of a cylinder 5 and the outer peripheral surface 41 of the seal ring 4 but also through the gap of the seal ring 4, with the substantial reduction in the resultant sealing effect.

SUMMARY OF THE INVENTION

With these in mind, it is a major object of the present device to provide a rotary shaft seal ring having an excellent sealing effect.

Additional object other than these specification stated will become apparent on concideration of the accompanying drawings and when considered in conjunction with the specification and claim.

BRIEF DESCRIPTION OF THE DRAWING

FIG. 1 is a longitudinal section showing a shaft seal device of a conventionally known type;

FIG. 2 is an enlarged section showing an essential portion of FIG. 1;

FIG. 3A is a longitudinal section showing a seal ring to be used in the present device;

FIG. 3B is a longitudinal section showing an auxiliary seal ring to be also used in the present device;

FIG. 4 is a sectional view showing an essential portion of the present seal ring structure; and FIG. 5 is an explanatory view illustrating the present seal ring structure.

The rotary shaft seal ring according to the present device will now be explained in conjunction with the accompanying drawing.

DESCRIPTION OF THE PREFERRED EMBODIMENT

The seal ring structure to be employed in the present device includes a seal ring 6, which is formed, as shown in FIG. 3A, on its outer peripheral surface with an annular groove 62 and at its peripheral ends with a gap 64 and which is made expandable radially outwardly, and an auxiliary seal ring 7 of a rectangular cross section which is formed, as shown in FIG. 3B, with a gap 72 at its peripheral ends and which is also made expandable radially outwardly. This auxiliary seal ring 7 has its axial width B made smaller than the axial width B' of the annular groove 62 on the outer periphery 61 of the seal ring 6 and its radial thickness T made smaller than the radial depth T' of the annular groove 61 of the seal ring 6.

With the seal ring 6 and the auxiliary seal ring 7 thus constructed, the former ring 6 is installed in the seal ring groove 3 formed on the carrier 2, and the latter ring 7 is installed in the annular seal groove 62 of the former ring 6, when in actual use, as better seen from FIG. 4. In this instance, moreover, the gaps of the seal ring 6 and of the auxiliary seal ring 7 are misaligned from each other so as to improve the sealing effect of the present seal ring structure. If desired, known rotation preventive mechanism may be used to hold the misalignment.

Since the gaps of the seal ring 6 and of the auxiliary seal ring 7 are angularly spaced from each other, as explained in the above, the liquid leakage, which might otherwise occur through the gap of the seal ring structure, can be prevented efficiently. Moreover, the liquid leakage, which might otherwise take place through the slight clearance between the inner wall 51 of the cylinder 5 and the outer periphery of the seal ring 6, can be prevented by the liquid packing effect due to the centrifugal force, which is established both in the swirling liquid in a clearance 8 defined by the outer side face 63 of pressure side of the seal ring 6 and the side face 31 of the annular groove 3 and in the swirling liquid in clearances 9 and 9 defined by the inner side faces 621 and 621 of the annular groove 62 and the side faces 71 and 71 of the auxiliary seal ring 7 as the two seal rings 6 and 7 rotate in accordance with the rotation of the carrier 2. Thus, the liquid can be efficiently prevented from any leakage through a slight clearance between the inner wall 51 of the cylinder 5 and the outer periphery 61 of the seal ring 6 especially by the liquid packing effect and by the labyrinth packing effect of the liquid in the clearances 9 and 9 which are defined by the inner side faces 621 and 621 of the annular groove 62 and the side faces 71 and 71 of the auxiliary seal ring 7. The fact that the liquid packing effect can be obtained in the clearances 8, 9 and 9 so as to efficiently prevent the possible liquid leakage will now be verified by calculating the pressure levels of the fluid (or liquid in this instance) in those clearances.

The liquid pressure in the outer periphery is obtainable from the following equation:

$$P_r = (\zeta \omega^2 / 2g)(r_1^2 - r_2^2),$$

where $P_r$ denotes a pressure level (kg/cm$^2$) at any radius;

$\zeta$ denotes a weight (kg/cm$^3$) per unit volume of liquid;

$r_1$ denotes an outer peripheral radius (cm) when the liquid is swirling;

$r_2$ donotes an inner peripheral radius (cm) when the liquid is swirling;

$\omega$ donotes an angular velocity (radian/second) of the swirling liquid, being assumed as customary to be one half of the angular velocity $\omega'$ of the rotating disc and shaft, and will be expressed, if the number of rotation of the disc and shaft be n (r.p.m.), to be $\pi n/60$ since $\omega' = 2\pi n/60$; and g denotes the acceleration of gravity (980 cm/second$^2$).

Now the liquid pressure in the outer periphery will be calculated for the case where the liquid is water having the weight per unit volume of 0.001 kg/cm$^2$, with the assumptions n=3600 r.p.m., $r_1$=50 mm, $r_2$=40 mm, $r'_1 = 50$ mm, and $r'_2 = 45$ mm (reference should be made to FIG. 5).

Then, the liquid pressure in the clearance 8 can be calculated as follows:

$$P_{r1} = \frac{\psi \omega^2}{2g}(r_1^2 - r_2^2)$$

$$= \frac{0.001 \times 188.4^2}{2 \times 980} \times (5^2 - 4^2)$$

$$= \frac{0.001 \times 35494.56}{1960} \times 9$$

$$= 0.16298 \text{ kg/cm}^2.$$

Likewise, the liquid pressure in the clearances 9 and 9 can also be calculated as follows:

$$P_{r2} = \frac{0.001 \times 188.4^2}{2 \times 980} \times (5^2 - 4.5^2)$$

$$= \frac{0.001 \times 188.4^2}{1960} \times 4.75$$

$$= 0.086019 \text{ kg/cm}^2.$$

Thus, the calculated liquid pressures in the clearances 8, 9 and 9 are about 0.163 kg/cm² and 0.086 kg/cm², respectively, and it is quite apparent that the seal ring structure of the present device can enjoy the desired liquid packing effect. In this way, therefore, it can be verified that the liquid leakage, which might take place through the slight clearances between the outer peripheral surfaces of the two seal rings 6 and 7 and the inner wall of the cylinder 5, can be reliably avoided.

The present invention has been described in detail in the specification with particular reference to a preferred embodiment, but it will be understood that various modification as discribed hereinabove and defined in the appended claim.

What is claimed is:

1. A composite seal ring structure in combination with a cylindrical ring carrier having a first peripheral slot therein, a cylindrical chamber containing liquid, said carrier being positioned within the chamber so that the liquid is on only one side of the ring structure, a shaft fixed to the ring carrier for rotating said carrier and ring structure, the outside diameter of said carrier being smaller than the inside diameter of said chamber, said ring structure preventing the liquid from leaking past said ring structure to the other side of said ring structure, said composite seal ring structure comprising:
   a first radially expandable split seal ring having a gap and disposed in said first slot so that the outer periphery of said first ring engages the inner peripheral surface of said chamber, the axial width of said first ring being less than that of said first slot to form in said slot a first clearance space which is open to said one side of said chamber so that said space is filled with said liquid; and
   a second radially expandable split seal ring having a gap and disposed within a second peripheral slot formed in said first ring and having an axial width less than that of said second slot to form second and third clearance spaces between the adjacent sides of said second ring and said second slot for containing liquid in said spaces, the outer periphery of said second ring also engaging the inner peripheral surface of said chamber;
   the gaps in said first and second split rings being radially misaligned;
   whereby, upon rotation of said shaft, the first and second rings, and the liquid in said first, second and third clearance spaces, also rotate so that the liquid packing effect produced by centrifugal force prevents the liquid from leaking past said composite seal ring structure.

2. A composite seal ring structure as defined in claim 1 wherein the radial length of the annulus of said second ring is less than the radial length of said second slot in said first ring.

* * * * *